United States Patent
Biondo et al.

(10) Patent No.: US 10,442,433 B2
(45) Date of Patent: Oct. 15, 2019

(54) SYSTEMS AND METHODS FOR OVERRIDING VEHICLE LIMITATION SYSTEM

(71) Applicant: GM Global Technology Operations LLC, Detroit, MI (US)

(72) Inventors: William A. Biondo, Beverly Hills, MI (US); David T. Proefke, Troy, MI (US); Fred W. Huntzicker, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/603,991

(22) Filed: May 24, 2017

(65) Prior Publication Data

US 2018/0339706 A1 Nov. 29, 2018

(51) Int. Cl.
| | |
|---|---|
| *B60W 30/18* | (2012.01) |
| *B60W 50/12* | (2012.01) |
| *B60W 50/10* | (2012.01) |
| *B60W 10/06* | (2006.01) |
| *B60W 10/10* | (2012.01) |
| *G09B 19/16* | (2006.01) |
| *G05D 1/00* | (2006.01) |

(Continued)

(52) U.S. Cl.
CPC ...... *B60W 30/18009* (2013.01); *B60W 10/06* (2013.01); *B60W 10/10* (2013.01); *B60W 50/10* (2013.01); *B60W 50/12* (2013.01); *G05D 1/0055* (2013.01); *G09B 19/16* (2013.01); *B60W 2050/0071* (2013.01); *B60W 2540/06* (2013.01); *B60W 2540/24* (2013.01); *B60W 2550/404* (2013.01); *B60W 2710/0666* (2013.01); *B60W 2710/30* (2013.01); *B60W 2720/10* (2013.01); *B60W 2750/40* (2013.01); *G05D 2201/0213* (2013.01); *H04W 88/02* (2013.01)

(58) Field of Classification Search
CPC ...... B60W 10/06; B60W 10/10; B60W 50/10; B60W 50/12; G05D 1/0022; G09B 19/16
USPC .......................................................... 701/2
See application file for complete search history.

(56) References Cited

U.S. PATENT DOCUMENTS

| | | | | |
|---|---|---|---|---|
| 4,738,333 | A | * | 4/1988 | Collier ...................... A61B 5/18 180/272 |
| 8,196,694 | B2 | * | 6/2012 | Biondo ................ B60K 28/063 180/271 |

(Continued)

OTHER PUBLICATIONS

U.S. Appl. No. 15/603,809, filed May 24, 2017, Biondo et al.
U.S. Appl. No. 15/715,567, filed Sep. 26, 2017, Biondo et al.

*Primary Examiner* — Maceeh Anwari (57) ABSTRACT

An override system of a vehicle includes a command module configured to: receive a concentration of a chemical in a driver's body measured using a chemical measurement device of the vehicle; and when the concentration of the chemical is greater than the predetermined concentration of the chemical, prevent movement of the vehicle. An override module is configured to, in response to receipt of user input indicative of an override request while the concentration of the chemical is greater than the predetermined concentration of the chemical, selectively generate a command to override the prevention of movement of the vehicle. The command module is further configured to, in response to the command, selectively allow movement of the vehicle.

21 Claims, 5 Drawing Sheets

(51) Int. Cl.
*B60W 50/00* (2006.01)
*H04W 88/02* (2009.01)

(56) References Cited

U.S. PATENT DOCUMENTS

| | | |
|---|---|---|
| 9,975,552 B2 | 5/2018 | Biondo et al. |
| 2017/0131261 A1 | 5/2017 | Biondo et al. |

* cited by examiner

SYSTEMS AND METHODS FOR OVERRIDING VEHICLE LIMITATION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle control systems and methods and more particularly to systems and methods for controlling vehicle propulsion and use based on driver impairment information.

Some vehicles may include an ignition interlock device (IID). For example, installation and use of an IID may be required as a condition for allowing a driver to drive a vehicle. An example type of IID is a breath alcohol ignition interlock device (BAIID).

When a driver attempts to start a vehicle, the driver inputs a breath sample into the BAIID by blowing air into the BAIID. The BAIID determines a blood alcohol concentration (BAC) of the driver based on concentrations of one or more chemicals (e.g., ethanol) in the air blown into the BAIID. When the breath sample satisfies one or more predetermined criteria (e.g., at least a predetermined volume of air, BAC less than a predetermined value, etc.), the BAIID may allow the driver to start and drive the vehicle. When the one or more of the predetermined criteria are not satisfied, however, the BAIID prevents startup and driving of the vehicle.

Other types of IIDs measure concentration of other types of chemicals in blood of users, such as marijuana, methamphetamines, cocaine, etc. Like BAIIDs, other types of IIDs prevent startup and driving of the vehicle when one or more predetermined criteria are not satisfied.

SUMMARY

In a feature, an override system of a vehicle is described. A command module is configured to: receive a concentration of a chemical in a driver's body measured using a chemical measurement device of the vehicle; and when the concentration of the chemical is greater than the predetermined concentration of the chemical, prevent movement of the vehicle. An override module is configured to, in response to receipt of user input indicative of an override request while the concentration of the chemical is greater than the predetermined concentration of the chemical, selectively generate a command to override the prevention of movement of the vehicle. The command module is further configured to, in response to the command, selectively allow movement of the vehicle.

In further features, the chemical is alcohol, the command module prevents a transmission control module from shifting of a transmission of the vehicle out of park when the concentration of the chemical is greater than the predetermined concentration of the chemical, and, in response to the command, the command module allows the transmission control module to shift the transmission out of park based on signals from a transmission range selector of the vehicle.

In further features the override module is configured to: generate the command to limit a vehicle speed to a predetermined maximum speed; when a cellular transceiver of the vehicle is connected to a cellular network, set the predetermined maximum speed to a first predetermined maximum speed; and when the cellular transceiver is connected to the cellular network, set the predetermined maximum speed to a second predetermined maximum speed, where the second predetermined maximum speed is less than the first predetermined maximum speed. The command module is further configured to, in response to the command, command an engine control module of the vehicle to limit the torque output of the engine based on limiting the vehicle speed to less than or equal to the predetermined maximum speed.

In further features the override module is further configured to: generate the command to limit a distance that the vehicle can travel pursuant to the override request to a predetermined distance; when the cellular transceiver of the vehicle is connected to the cellular network, set the predetermined distance to a first predetermined maximum distance; and when the cellular transceiver is connected to the cellular network, set the predetermined distance to a second predetermined maximum distance, where the second predetermined maximum distance is less than the first predetermined maximum distance.

In further features, the command module is further configured to, in response to the command, when the distance traveled by the vehicle after the override request is greater than the predetermined distance at least one of: command the transmission control module to shift the transmission to neutral; and command the engine control module to limit torque to limit a vehicle speed to zero.

In further features the override module is further configured to: when the cellular transceiver of the vehicle is connected to the cellular network, generate a second command to output sound from a horn of the vehicle based on a first predetermined duration; when the cellular transceiver is not connected to the cellular network, generate the second command to output sound from the horn of the vehicle based on second predetermined duration; the second predetermined duration is less than the first predetermined duration. An output control module is configured to apply power to the horn based on the second command.

In further features the override module is further configured to: when the cellular transceiver of the vehicle is connected to the cellular network, generate the second command to further turn an exterior light of the vehicle on and off at a first predetermined rate; when the cellular transceiver of the vehicle is not connected to the cellular network, generate the second command to turn the exterior light of the vehicle on and off at a second predetermined rate, where the second predetermined rate is faster than the first predetermined rate. The output control module is further configured to turn the exterior light of the vehicle on and off based on the second command.

In further features, the override module is configured to, after generating the command, selectively deny future requests to override the prevention of the movement of the vehicle.

In further features, the override module is configured to: in response to the receipt of user input indicative of the override request while the concentration of the chemical is greater than the predetermined concentration of the chemical, administer a behavioral test to a driver of the vehicle; based on input received during the behavioral test, determine whether the driver passed the behavioral test; and generate the command to override the prevention of the movement of the vehicle in response to a determination that the driver passed the behavioral test.

In further features: an output control module is configured to, for the behavioral test, output at least one of audible and visual requests for performance of predetermined actions by the driver; and the override module is further configured to determine whether the driver passed the behavioral test based on comparisons of the input received with expected inputs for the predetermined actions, respectively.

In a feature, an override method for a vehicle includes: receiving a concentration of a chemical in a driver's body measured using a chemical measurement device of the vehicle; when the concentration of the chemical is greater than the predetermined concentration of the chemical, prevent movement of the vehicle; in response to receipt of user input indicative of an override request while the concentration of the chemical is greater than the predetermined concentration of the chemical, selectively generating a command to override the prevention of movement of the vehicle; and in response to the command, selectively allowing movement of the vehicle.

In further features the chemical is alcohol, the prevention of movement of the vehicle includes preventing shifting of a transmission of the vehicle out of park when the concentration of the chemical is greater than the predetermined concentration of the chemical, and the selectively allowing movement of the vehicle includes, in response to the command, allowing shifting the transmission out of park based on signals from a transmission range selector of the vehicle.

In further features, the method further includes: generating a command to limit a vehicle speed to a predetermined maximum speed; when a cellular transceiver of the vehicle is connected to a cellular network, setting the predetermined maximum speed to a first predetermined maximum speed; when the cellular transceiver is connected to the cellular network, setting the predetermined maximum speed to a second predetermined maximum speed, where the second predetermined maximum speed is less than the first predetermined maximum speed; and, in response to the command, limiting the torque output of the engine based on limiting the vehicle speed to less than or equal to the predetermined maximum speed.

In further features, the method further includes: generating the command to limit a distance that the vehicle can travel pursuant to the override request to a predetermined distance; when the cellular transceiver of the vehicle is connected to the cellular network, setting the predetermined distance to a first predetermined maximum distance; and when the cellular transceiver is connected to the cellular network, setting the predetermined distance to a second predetermined maximum distance, where the second predetermined maximum distance is less than the first predetermined maximum distance.

In further features, the method further includes, in response to the command, when the distance traveled by the vehicle after the override request is greater than the predetermined distance at least one of: shifting the transmission to neutral; and limiting a torque output based on limiting the vehicle speed to zero.

In further features, the method further includes: when the cellular transceiver of the vehicle is connected to the cellular network, generating a second command to output sound from a horn of the vehicle based on a first predetermined duration; when the cellular transceiver is not connected to the cellular network, generate the second command to output sound from the horn of the vehicle based on a second predetermined duration, where the second predetermined duration is less than the first predetermined duration; and applying power to the horn based on the second command.

In further features, the method further includes: when the cellular transceiver of the vehicle is connected to the cellular network, generating the second command to further turn an exterior light of the vehicle on and off at a first predetermined rate; when the cellular transceiver of the vehicle is not connected to the cellular network, generating the second command to turn the exterior light of the vehicle on and off at a second predetermined rate, where the second predetermined rate is faster than the first predetermined rate; and turning the exterior light of the vehicle on and off based on the second command.

In further features the method further includes, after generating the command, selectively denying future requests to override the prevention of movement of the vehicle.

In further features the method further includes: in response to the receipt of user input indicative of the override request while the concentration of the chemical is greater than the predetermined concentration of the chemical, by an override control module, administering a behavioral test to a driver of the vehicle; based on input received during the behavioral test, by the override control module, determining whether the driver passed the behavioral test; and generating the command to override the prevention of the movement of the vehicle in response to a determination that the driver passed the behavioral test.

In further features the method further includes: for the behavioral test, by an output control module, outputting at least one of audible and visual requests for performance of predetermined actions by the driver; and determining, by the override control module, whether the driver passed the behavioral test based on comparisons of the input received with expected inputs for the predetermined actions, respectively.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An ignition interlock device (IID) of a vehicle, such as a breath alcohol ignition interlock device (BAIID), prevents the vehicle from moving when the IID measures a concentration of a chemical (e.g., alcohol) in the driver is greater than a predetermined concentration. IIDs may also prevent startup of the vehicle when the concentration is greater than the predetermined concentration.

Generally, IIDs do not allow the decision to prevent the vehicle from moving (due to the concentration is greater than the predetermined concentration) to be overridden to any extent. A limitation control module according to the present disclosure allows for the decision to prevent the vehicle from moving to be overridden despite the concentration being greater than the predetermined concentration or a fault is present in the IID preventing a valid concentration being determined.

For example, the limitation control module may allow a transmission of the vehicle to be shifted out of park and for the vehicle to be driven up to a predetermined maximum distance and up to a predetermined maximum vehicle speed in response to receipt of a user request to override. The limitation control module may set the predetermined maximum distance and/or the predetermined maximum vehicle speed based on whether the vehicle is outside of a range of a cellular communication network. During vehicle movement, however, the limitation control module may flash exterior lights of the vehicle on and off and/or activate a horn of the vehicle, for example, in an effort to notify others of the use of the vehicle.

As another example, in response to a user request to completely override the decision to prevent the vehicle from moving, the limitation control module may perform a behavioral assessment (test) of the driver and allow normal operation of the vehicle if the driver passes the behavioral assessment. This may allow normal vehicle operation if, for example, the measurement of the concentration was improper, such as when a fault is present in the IID or in the chemical measurement device.

Figure 1:
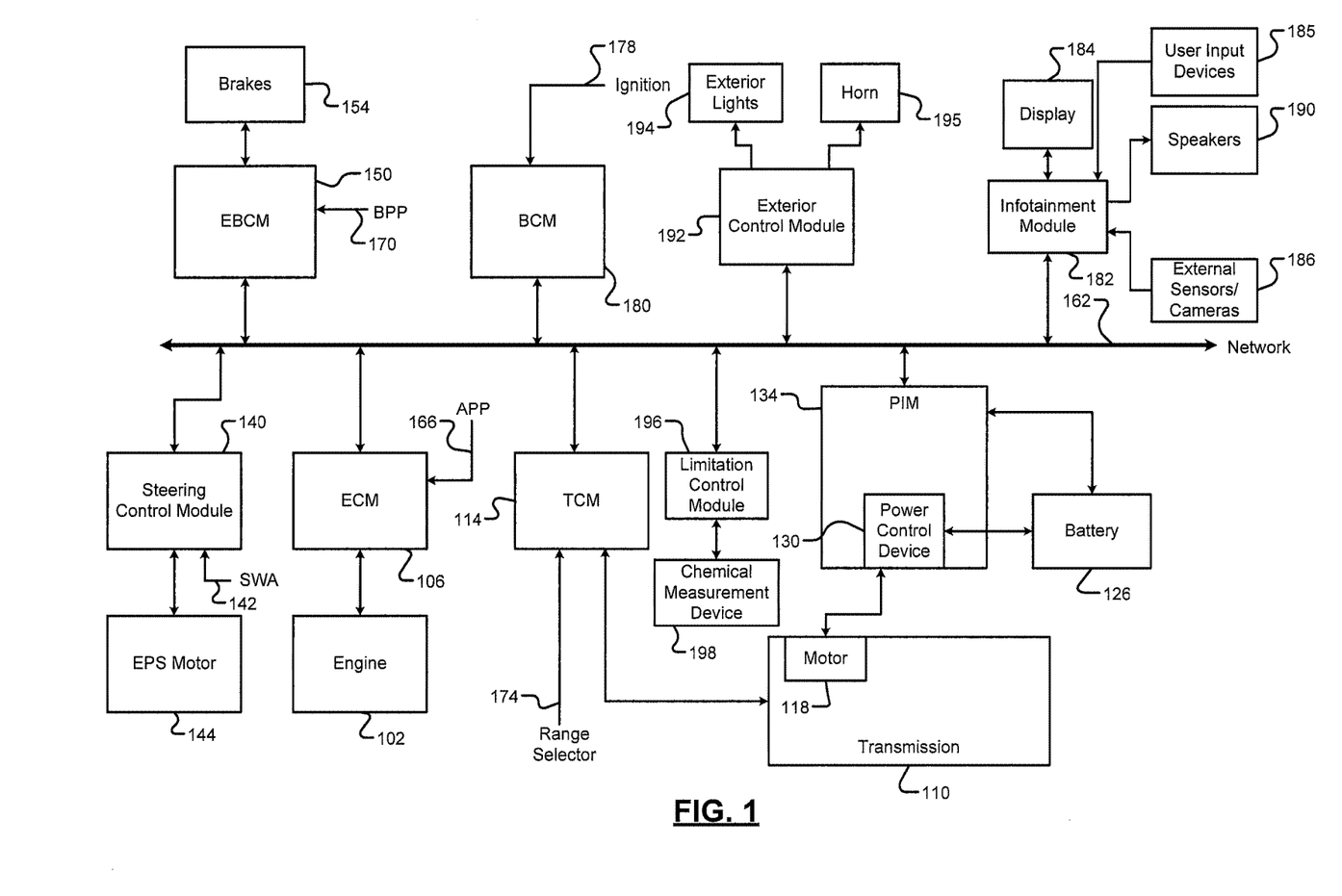
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles. Also, while the example of a vehicle is provided, the present application is also applicable to non-vehicle implementations.

An engine 102 combusts an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130, such as an inverter. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control mechanical brakes 154 of the vehicle. Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. The ECM 106 controls actuation of the engine actuators based on the APP 166, the BPP 170, and/or one or more other parameters.

The TCM 114 controls gear selection within the transmission 110, for example, based on a range selector input 174 from a range selector, such as a park, reverse, neutral, drive lever (PRNDL) or another suitable type of transmission range selector. The range selector input 174 may be provided to the TCM 114.

An ignition state 178 may be provided to a body control module (BCM) 180. For example, the ignition state 178 may be generated based on input by a driver via an ignition key, button, or switch. At a given time, the ignition state 178 may be one of off, accessory, run, and crank. When the ignition state 178 transitions from off or accessory to crank, the body control module 180 generally closes a starter switch (e.g., relay). Closing of the starter switch engages a starter with the engine 102 and drives rotation of the starter. When the starter is engaged with the engine 102, rotation of the starter drives rotation of the engine 102 for starting of the engine 102.

The vehicle system may also include an infotainment module 182. The infotainment module 182 controls what is displayed on a display 184 located within a passenger cabin of the vehicle. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc. located within a passenger compartment of the vehicle.

The infotainment module 182 may receive input from a plurality of external sensors and cameras, generally illustrated in FIG. 1 by 186. For example, the infotainment module 182 may display video, various views, and/or alerts on the display 184 via input from the external sensors and cameras 186. The infotainment module 182 may also generate output via one or more other devices. For example, the infotainment module 182 may output sound via one or more speakers 190 of the vehicle.

The vehicle may also include an exterior control module 192 that controls illumination of various exterior lights of the vehicle. For example, the exterior control module 192 controls illumination of reverse lights, brake lights, headlights, turn lights, and other exterior lights ("exterior lights") 194 of the vehicle. The exterior control module 192 also controls one or more horns, such as horn 195 of the vehicle.

The vehicle also includes a limitation control module 196 and a chemical measurement device 198. For example only, the chemical measurement device 198 may include a breath alcohol concentration measurement device (e.g., a breathalyzer) that measures blood alcohol concentration (BAC) based on one or more amounts of one or more chemicals (e.g., ethanol) present in a breath sample input to the chemical measurement device 198.

While the example of the chemical measurement device 198 including a BAC measurement device will be discussed, the chemical measurement device 198 may include another suitable type of chemical measurement device and may not be breath based. For example, the chemical measurement device 198 may measure a concentration of one or more other types of chemicals in blood, such as marijuana (e.g., THC), amphetamines, etc. Other types of chemical measurement devices may be vision based, such as based on capillary action of a driver's skin in response to the chemical measurement device 198 applying a predetermined type of light (e.g., infrared or laser) to the driver's skin. Measurements provided by another type of chemical measurement device may be used in place of BAC.

The chemical measurement device 198 may measure a BAC each time a driver starts the engine 102 (e.g., each time the ignition state 178 transitions to crank from OFF or accessory). Alternatively, the chemical measurement device 198 may measure a BAC each time the ignition state 178 transitions to accessory.

The limitation control module 196 generates commands to allow, allow to a limited extent, or prevent vehicle movement based on the measurements from the chemical measurement device 198. For example, the limitation control module 196 may prevent vehicle movement (e.g., prevent shifting of the transmission 110 out of park) when the chemical measurement device 198 measures a BAC of greater than a predetermined value (e.g., 0.08, 0.02, 0.00, or another suitable value). For example, the limitation control module 196 may command the TCM 114 to maintain the transmission 110 in park and to ignore the range selector input 174 from the range selector when the chemical measurement device 198 measures a BAC of greater than the predetermined value. The limitation control module 196, however, allows the engine 102 to be started despite the BAC being greater than the predetermined value, for example, to allow an HVAC system of the vehicle to be used to warm and/or cool the passenger compartment of the vehicle.

Under some circumstances, a driver of the vehicle may still wish to drive a vehicle while the driver has a BAC that is greater than the predetermined value. For example, despite having a BAC that is greater than the predetermined value, a driver may wish to drive the vehicle to transport an injured person, to prevent the vehicle from being damaged, and/or for one or more other reasons.

According to the present disclosure, the limitation control module 196 allows for vehicle movement when the driver has a BAC measurement that is greater than the predetermined value. For example, the limitation control module 196 may initiate a behavioral assessment of the driver in response to receipt of a request by the driver and may allow normal vehicle operation if the driver passes the behavioral assessment. For example, the driver may request a behavioral assessment when the driver believes that the driver's BAC was inaccurately measured as being greater than the predetermined value. BAC measurements may be inaccurate under some circumstances, such as when the chemical measurement device 198 has a fault and in other circumstances.

The limitation control module 196 also allows for limited vehicle movement when the driver has a BAC measurement that is greater than the predetermined value when a request is received to override the prevention of vehicle movement (e.g., prevent shifting of the transmission 110 out of park). For example, the limitation control module 196 may limit a distance that the vehicle may be driven and/or limit a speed at which the vehicle is allowed to travel to a maximum speed. This may allow limited movement of the vehicle, for example, for an emergency situation. The limitation control module 196 may limit the number times requests to override the prevention of vehicle movement are honored to prevent overuse or misuse of the ability to override the prevention of vehicle movement.

The vehicle may include one or more additional control modules that are not shown, such as a chassis control module, a battery pack control module, etc. The vehicle may omit one or more of the control modules shown and discussed. Additionally, while various modules are shown as separate, one or more modules may be combined.

Figure 2:
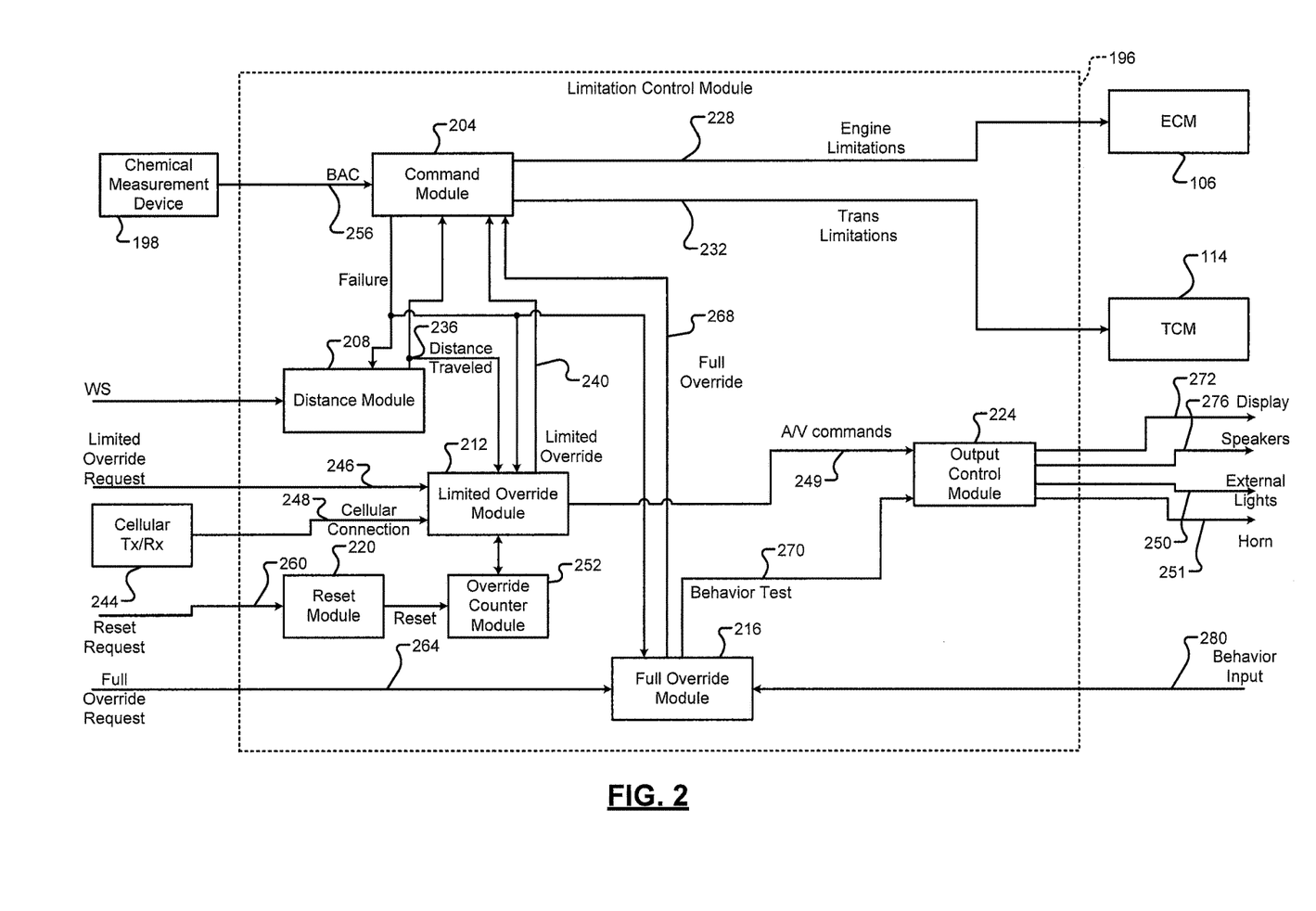
FIG. 2 is a functional block diagram of an example of a limitation control module.

Referring now to FIG. 2, a functional block diagram of an example implementation of the limitation control module 196 is presented. The limitation control module 196 includes a command module 204, a distance module 208, a limited override module 212, a full override module 216, a reset module 220, and an output control module 224.

The command module 204 generates engine commands 228 and transmission commands 232. The ECM 106 selectively limits torque output of the engine 102 based on the engine commands 228. For example, the engine commands 228 may include a maximum vehicle speed. The ECM 106 may limit torque output of the engine 102 to limit a vehicle speed from exceeding the maximum vehicle speed.

The TCM 114 selectively limits operation of the transmission 110 based on the transmission commands 232. For example, the transmission commands 232 may include an indicator of whether to allow the transmission 110 to be shifted out of park and commands to shift the transmission 110 to specific state or range. Based on the indicator of whether to allow the transmission 110 to be shifted out of park, the TCM 114 may shift the transmission 110 out of park based on the range selector input 174 or not shift the transmission 110 out of park regardless of the range selector input 174. The TCM 114 may shift the transmission 110 to the specific state or range (e.g., neutral, first gear, second gear, etc.) in response to a command to shift the transmission 110 to a specific state or range. For example, the command module 204 may command the TCM 114 to shift the transmission 110 to neutral when a distance traveled 236 for a limited override 240 is greater than a maximum distance. The distance module 208 determines the distance traveled 236 by the vehicle.

When a BAC measurement 256 of a passing breath sample is less than a predetermined BAC, the command module 204 may set the engine commands 228 and the transmission commands 232 to not limit operation of the engine 102 or the transmission 110. The predetermined BAC is calibratable and may be, for example, 0.00, 0.01, 0.02, 0.04, 0.08, or another suitable BAC.

When the BAC measurement 256 is greater than the predetermined BAC, however, the command module 204 may set the engine commands 228 and/or the transmission commands 232 to limit operability of the engine 102 and/or the transmission 110. The chemical measurement device 198 may measure the BAC of the driver each time the driver starts the vehicle (e.g., when the ignition state 178 transitions to accessory or crank) before the TCM 114 allows the transmission 110 to be shifted out of park.

For example, for the limited override 240, in response to receipt of a user request for a limited override 246 of the command module 204's limitation on the operability of the engine 102 and/or the transmission 110, the command module 204 may set the engine commands 228 to limit the vehicle speed to a first predetermined maximum speed when a cellular transceiver (Tx/Rx) 244 is connected to a cellular network. The first predetermined maximum speed is calibratable and maybe set to, for example, 10 miles per hour (mph), 15 mph, 20 mph, 25 mph, or another suitable maximum speed of the vehicle. The command module 204 may also modify the first predetermined maximum speed allowed to 0 mph upon determination that a maximum allowed distance has been travelled. The command module 204 may also generate the transmission commands 232 to limit the distance traveled 236 to a first predetermined maximum distance when the cellular transceiver 244 is connected to the cellular network. The command module 204 may generate the transmission commands 232 to include a command to shift the transmission 110 to neutral when the distance traveled 236 is greater than the first predetermined maximum distance. The first predetermined maximum distance is calibratable and maybe set to, for example, ¼ of a mile, ½ of a mile, ¾ of a mile, 1 mile, or another suitable maximum traveling distance of the vehicle.

The cellular transceiver 244 may continuously attempt to connect to the cellular network while the vehicle is on. The cellular transceiver 244 may generate a cellular connection signal 248 that indicates whether the cellular transceiver 244 is presently connected to the cellular network or not.

When the cellular transceiver 244 is not connected to the cellular network (indicating that the vehicle is out of range of coverage of the cellular network), the command module 204 may set the engine commands 228 to limit the vehicle speed to a second predetermined maximum speed for the limited override 240. The second predetermined maximum speed is calibratable and is greater than the first predetermined maximum speed, such as 30 mph, 40 mph, 50 mph, 60 mph, or 70 mph. In various implementations, the second predetermined maximum speed may be a maximum possible speed of the vehicle as to not limit the speed of the vehicle when the cellular transceiver 244 is not connected to the cellular network. The command module 204 may also generate the transmission commands 232 to limit the distance traveled 236 to a second predetermined maximum distance when the cellular transceiver 244 is not connected to the cellular network. The command module 204 may generate the transmission commands 232 to include a command to shift the transmission 110 to neutral when the distance traveled 236 is greater than the second predetermined maximum distance. The second predetermined maximum distance is calibratable and is greater than the first predetermined maximum distance. For example only, the second predetermined maximum distance and may be 5 miles, 10 miles, 15 miles, 20 miles, or another suitable maximum traveling distance of the vehicle. In various implementations, the command module 204 may set the second predetermined maximum distance to a very large distance (e.g., 10,000 miles). This may allow the vehicle to be driven into the coverage of the cellular network at which point the command module 204 may transition to the use of the first predetermined maximum speed and the first predetermined maximum distance.

Additionally, for the limited override 240, the limited override module 212 may generate audio/visual (A/V) commands 249. The output control module 224 generates external audio/visual output according to the audio/visual commands 249, for example, to warn other users as to the driver's operation of the vehicle. For example, the output control module 224 may illuminate or flash (on and off) 250 one or more of the exterior lights 194 based on the audio/visual commands 249. The output control module 224 may additionally or alternatively generate sound 251 via the horn 195 based on the audio/visual commands 249. In various implementations, the output control module 224 may command the exterior control module 192 to perform these actions.

When the cellular transceiver 244 is connected to the cellular network, the limited override module 212 may set the audio/visual commands 249 to first predetermined audio/visual commands for the limited override 240. When the cellular transceiver 244 is not connected to the cellular network, the limited override module 212 may set the audio/visual commands 249 to second predetermined audio/visual commands. The first predetermined audio/visual commands may be externally less obvious than the second predetermined audio/visual commands.

For example, the first predetermined audio/visual commands may include a command to flash the exterior lights 194 on and off at a first predetermined intensity and/or at a first predetermined rate. The first predetermined audio/visual commands may also include a command to honk the horn 195 at a first predetermined duration continuously or on and off at a second predetermined rate. The second predetermined audio/visual commands may include a command to flash the exterior lights 194 on and off at a second predetermined intensity and/or at a second predetermined rate. The second predetermined intensity may be greater than the first predetermined intensity and/or the second predetermined rate may be greater than the first predetermined rate as to be visually more obvious. The first predetermined audio/visual commands may also include a command to turn the horn 195 for a first predetermined duration before turning the horn 195 off or turning the horn 195 on (based on the first predetermined duration) and off at a third predetermined rate. The second predetermined audio/visual commands may also include a command to turn the horn 195 for a second predetermined duration before turning the horn 195 off or turning the horn 195 on (based on the second predetermined duration) and off at a fourth predetermined rate. The fourth predetermined duration may be greater than the third predetermined duration and/or the fourth predetermined rate may be greater than the third predetermined rate as to be audibly more obvious.

The limited override module 212 only allows a predetermined number of limited overrides, such as the limited override 240, to be performed before a reset is required. This is to prevent overuse and/or misuse of the ability to move the vehicle despite a BAC measurement being greater than the predetermined value. The predetermined number may be calibratable, is an integer greater than zero. For example only, the predetermined number may be 1.

An override counter module 252 counts the number of limited overrides performed since a last reset. The reset module 220 selectively resets the number of limited overrides performed (e.g., to zero), for example, in response to a request 260 from a predetermined resetting device to reset the number of limited overrides performed. The predetermined resetting device may connect to the vehicle, for example, wirelessly or via a physical input/output port, such as an On Board Diagnostics (OBD) input/output port. Additionally, the override counter module 252 may require performance of one or more predetermined authorizing and/or traceable transactions, for example, to further deter misuse or abuse of the reset capability.

When the BAC measurement 256 is greater than the predetermined value, the full override module 216 may initiate a behavioral test of the driver in response to receipt of a user request for a full override 264 of the command module 204's limitation on the operability of the engine 102 and/or the transmission 110. If the driver passes the behavioral test, the full override module 216 generates a full override signal 268, and the command module 204 generates the engine commands 228 and the transmission commands 232 as to not limit the operability of the engine 102 or the transmission 110. The ECM 106 and the TCM 114 may then control the engine 102 and the transmission 110 according to normal operation including allowing the transmission 110 to be shifted out of park, not imposing any limitation on the distance that the vehicle can travel, and not imposing any limitation on the engine 102 to limit vehicle speed. For example, the full override signal 268 may disable the command module 204. Disabling the command module 204 disables its ability to generate commands to limit operability of the engine 102 and the transmission 110.

The full override module 216 transmits behavioral test signals 270 to the output control module 224 for the behavioral test. The output control module 224 generates audible and/or visual output according to the behavioral test signals 270 for performance of the behavioral test. For example, performance of the behavioral test may include the output control module 224 displaying requests 272 on the display 184 for actions for the driver to perform and/or audibly outputting requests 276 via the speakers 190 for actions for the driver to perform. The requested actions may include, for example, actuating a brake pedal, actuating an accelerator pedal, actuating a specific button or switch within the passenger compartment, etc. Additionally or alternatively, the requested actions may include, for example, speaking a predetermined set of one or more letters, numbers, or words, such as speaking a portion of the alphabet between two predetermined letters in forward or backward order, or counting aloud from one predetermined number to another predetermined number. The requested actions may include a predetermined combination of one or more actions and/or other different actions. Additionally or alternatively, performance of the behavioral test may include the output control module 224 generating light via a light source within the passenger compartment for checking nystagmus of eyes of the driver. Performance of the behavioral test may also include one or more other audible and/or visual outputs.

The full override module 216 determines whether the driver passed the behavioral test based on user input and other behavioral test data received during the behavioral test. For example, the full override module 216 may determine whether the driver passed the behavioral test by comparing the user input with predetermined expected user input for requested actions and the periods between the requested actions and receipt of the associated input 280, respectively. The full override module 216 may additionally or alternatively determine whether the driver passed the behavioral test based on comparisons of data collected during the behavioral test (e.g., viewing angle where nystagmus occurred) with predetermined data.

As an example, the full override module 216 may determine a score (value) based on comparisons of the user input with the predetermined expected user input for the respective actions and the periods between the requested actions and receipt of the associated input 280, respectively. For user input that matches a predetermined expected user input for a requested action, the full override module 216 may increase the score. Conversely, for user input that does not match the predetermined expected user input for a requested action, the full override module 216 may decrease the score. Additionally or alternatively, the full override module 216 may increase the score when the period between a requested action and user input of matching the expected user input for the requested action is less than a predetermined period. The full override module 216 may decrease the score when the period between a requested action and the following user input is greater than the predetermined period.

For example, when the output control module 224 outputs an audible or visual request for the driver to actuate the accelerator pedal, the full override module 216 may increase the score when the APP 166 indicates that the driver actuated the accelerator pedal in response to the request. The output control module 224 may decrease the score when the APP 166 indicates that the driver did not actuate the accelerator pedal in response to the request or the driver actuated another pedal (e.g., the brake pedal) in response to the request.

When the output control module 224 outputs an audible or visual request for the driver to speak a portion of the alphabet between two predetermined letters in a predetermined order (forward or backward), a speech recognition module may determine speech output by the driver and received via one or more microphones in response to the request. The speech recognition module may determine the speech output by the driver using one or more speech recognition algorithms. Based on comparisons of letters spoken by the driver and a predetermined expected set of letters for the request, the full override module 216 may increase the score when the speech matches the predetermined expected set of letters. The full override module 216 may decrease the score when the speech does not match the predetermined expected set of letters.

While these examples of scoring are provided, the full override module 216 may additionally or alternatively adjust the score based on comparisons of one or more other types of data collected during the behavioral test and respective predetermined expected data. The full override module 216 may determine that the driver passed the behavioral test when the score is greater than a predetermined value. The full override module 216 may determine that the driver passed the behavioral test when the score is less than the predetermined value.

Figure 3A:
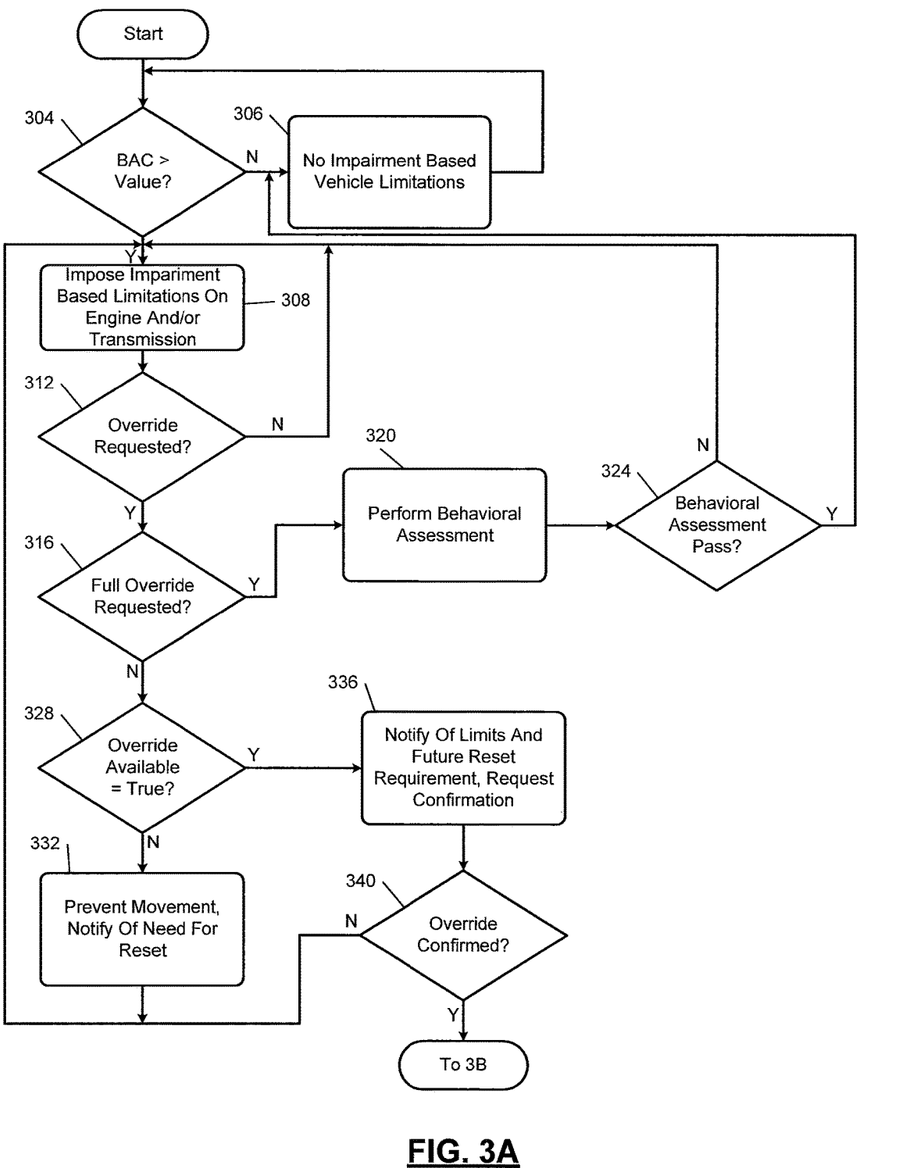
FIGS. 3A-3B include a flowchart depicting an example method of selectively allowing overriding of disablement of vehicle propulsion based on a measurement of a body chemical concentration being greater than a predetermined value.
Figure 3B:
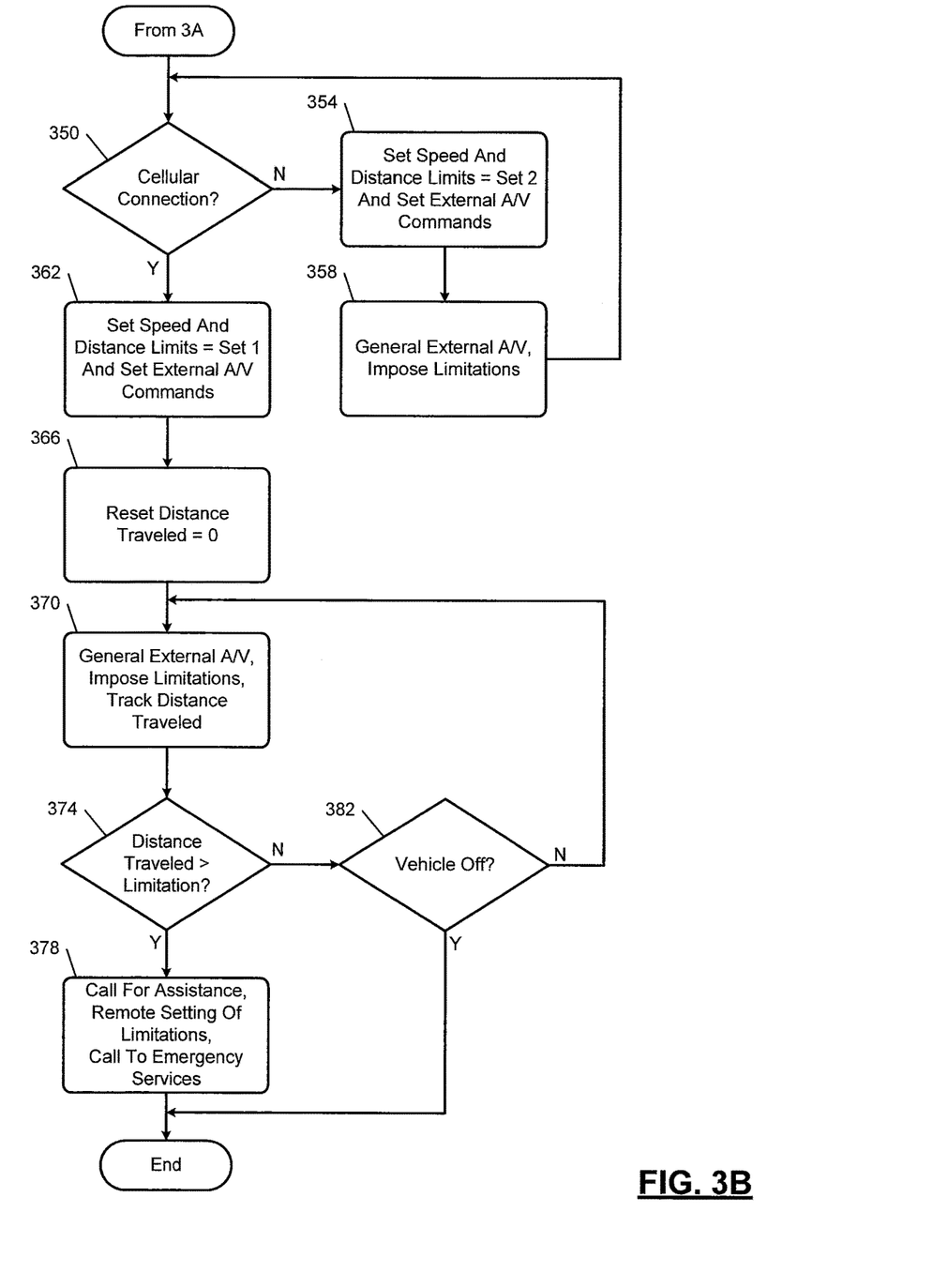

FIGS. 3A-3B include a flowchart depicting an example method of selectively allowing overriding of a disablement of vehicle propulsion based on the measurement of a body chemical concentration (e.g., BAC) greater than a predetermined value. Control begins with 304 where the chemical measurement device 198 measures the concentration of a chemical (e.g., BAC) in the driver of the vehicle and the command module 204 determines whether the measured concentration of a chemical in the body of the driver is greater than the predetermined value (e.g., the predetermined BAC). Control may begin, for example, when the driver transitions the ignition state 178 to accessory or crank. The driver may transition the ignition state 178 to accessory or crank, for example, by actuating an ignition key, button, or switch.

If 304 is false, the command module 204 does not impose any impairment based limitations on operation of the engine 102 or the transmission 110 at 306, and control returns to 304. For example, the command module 204 may allow the ECM 106 and the TCM 114 to control the engine 102 and the transmission 110 according to normal operation including, for example, allowing the TCM 114 to shift the transmission 110 out of park based on the range selector input 174. If 304 is false, control continues with 308.

At 308, the command module 204 imposes impairment based limitations on operation of the engine 102 and/or the transmission 110. For example, the command module 204 may command the TCM 114 to prevent shifting of the transmission 110 out of park. The command module 204 may also command the ECM 106 to limit torque output of the engine 102.

At 312, the limited override module 212 and the full override module 216 determine whether a user input request for a limited override 246 or a request for a full override 264 to override the impairment based limitations on operation of the engine 102 and/or the transmission 110 has been received. If 312 is true, control may continue with 316. If 312 is false, control may return to 308.

At 316, the limited override module 212 and the full override module 216 may determine whether the received request is for a full override of the limitations on operation of the engine 102 and/or the transmission 110. If 316 is true, control transfers to 320. If 316 is false, control continues with 328, which is discussed further below.

At 320 (for a full override request), the full override module 216 initiates the behavioral test via the output control module 224 and receives the associated input 280 during the behavioral test. The full override module 216 determines whether the driver passed the behavioral test at 324 based on the received input 280. If 324 is true, control transfers to 306 and removes the impairment based limitations on operation of the engine 102 and/or the transmission 110. As such, when the driver passes the behavioral test, the command module 204 removes all impairment based limitations on operation of the engine 102 and/or the transmission 110 and allows normal operation. If 324 is false, the driver failed the behavioral test, and control returns to 308 to maintain the impairment based limitations on operation of the engine 102 and/or the transmission 110.

At 328, (for a limited override request) the limited override module 212 determines whether a limited override is available. For example, the limited override module 212 may determine whether a limited override signal set by the override counter module 252 (FIG. 2) is set to a first state (e.g., true or 1). The override counter module 252 may set the limited override signal to the first state when a number of limited overrides performed in the vehicle since a last reset is less than a predetermined value (e.g., 1). The override counter module 252 may set the limited override signal to a second state when the number of limited overrides performed in the vehicle since the last reset is greater than or equal to the predetermined value. If 328 is false, at 332 the limited override module 212 generates audio and/or visual output indicative of the unavailability to provide a limited override the impairment based limitations on operation of the engine 102 and/or the transmission 110, for example, via the display 184 and/or the speakers 190. If 328 is true, control transfers to 336.

The limited override module 212 generates audio and/or visual output notifying the driver that limitations on the operation of the engine 102 and/or the transmission 110 will be imposed via the display 184 and/or the speakers 190. The limited override module 212 may also generate audio and/or visual output, via the display 184 and/or the speakers 190, notifying the driver that, if used, a reset may be needed in order to use the ability to implement a limited override of the impairment based limitations on operation of the engine 102 and/or the transmission 110 in the future. The limited override module 212 may also generate audio and/or visual output, via the display 184 and/or the speakers 190, requesting user input indicative of a confirmation to override the impairment based limitations on operation of the engine 102 and/or the transmission 110 to the limited extent.

At 340, the limited override module 212 may determine whether user input indicative of a confirmation of the request to override the impairment based limitations on operation of the engine 102 and/or the transmission 110 to the limited extent. If 340 is true, control continues with 350 of FIG. 3B. If 340 is false, control may return to 308 and the command module 204 continues to impose the impairment based limitations on operation of the engine 102 and/or the transmission 110.

Referring now to FIG. 3B, the limited override module 212 determines whether the cellular transceiver 244 is connected to the cellular network at 350. If 350 is false, at 354 the limited override module 212 sets the predetermined maximum distance to the second predetermined maximum distance, the predetermined maximum speed to the second predetermined maximum speed, and the audio/visual commands 249 to the second predetermined audio/visual commands. For example only, the second predetermined maximum speed and the second predetermined maximum distance may be set as to not impose any limitation on the distance that the vehicle can travel and the maximum speed that the vehicle can travel at. At 358, the ECM 106 and the TCM 114 limit operation of the engine 102 and the transmission 110 to limit the distance traveled by the vehicle to the predetermined maximum distance and the vehicle speed to the predetermined maximum vehicle speed. The output control module 224 also generates audio and/or visual indicators outside of the vehicle, for example via the horn 195 and/or the exterior lights 194, according to the predetermined audio/visual commands. Control may return to 350. If 350 is true, control continues with 362.

At 362, the limited override module 212 sets the predetermined maximum distance to the first predetermined maximum distance, the predetermined maximum speed to the second predetermined maximum speed, and the audio/visual commands 249 to the second predetermined audio/visual commands. For example only, the first predetermined maximum speed is less than the second predetermined maximum speed, the first predetermined maximum distance is less than the second predetermined maximum distance, and the first predetermined audio/visual commands may be more obvious than the second predetermined audio/visual commands.

The distance module 208 resets the distance traveled 236 by the vehicle (e.g., to zero) at 366. The distance traveled 236 therefore tracks the distance traveled by the vehicle since the limited override of the impairment based limitations on operation of the engine 102 and/or the transmission 110 began. At 370, the ECM 106 and the TCM 114 limit operation of the engine 102 and the transmission 110 to limit the distance traveled by the vehicle to the predetermined maximum distance and the vehicle speed to the predetermined maximum vehicle speed. The output control module 224 also generates audio and/or visual indicators outside of the vehicle, for example via the horn 195 and/or the exterior lights 194, according to the predetermined audio/visual commands. The distance module 370 also updates the distance traveled 236 by the vehicle. For example, the distance module 370 may determine the vehicle speed based on one or more wheel speeds 372 (FIG. 2) measured using wheel speed sensors, respectively. The distance module 370 may set the vehicle speed based on or equal to an average of two or more of the wheel speeds, such as an average of two or more undriven wheel speeds or an average of all of the wheel speeds. Undriven wheels may refer to wheels that do not receive torque output from the engine 102 or the transmission 110. The distance module 370 may mathematically integrate the vehicle speed each predetermined period (e.g., each instance of 370) to determine a distance that the vehicle traveled during each predetermined period. The distance module 370 may add the distance determined to the previous distance traveled 236 to update the distance traveled 236.

At 374, determines whether the distance traveled 236 is greater than the predetermined maximum distance. If 374 is true, the limited override module 212 may initiate a cellular call from the vehicle to a remote assistant via the cellular transceiver 244. Once connected, the driver may talk or otherwise communicate with an agent of the remote assistant to explain the circumstances of the movement of the vehicle. The agent may initiate an update of the predetermined maximum distance via the remote cellular transceiver 244 to allow the vehicle to continue to travel, if the agent determines that it is warranted at 378. Additionally or alternatively, the TCM 114 may shift the transmission 110 to neutral at 378. Additionally or alternatively, the agent or the limited override module 212 may initiate a cellular call to one or more emergency services, such as 911, police, etc. If 374 is false, control transfers to 382.

At 382, the limited override module 212 may determine whether the driver has turned the vehicle off. For example, the limited override module 212 may determine whether the driver transitioned the ignition state 178 to off. If 382 is true, control may end. If 382 is false, control may return to 370. While control is shown and discussed as ending, control may return to 304.

Figure 4:
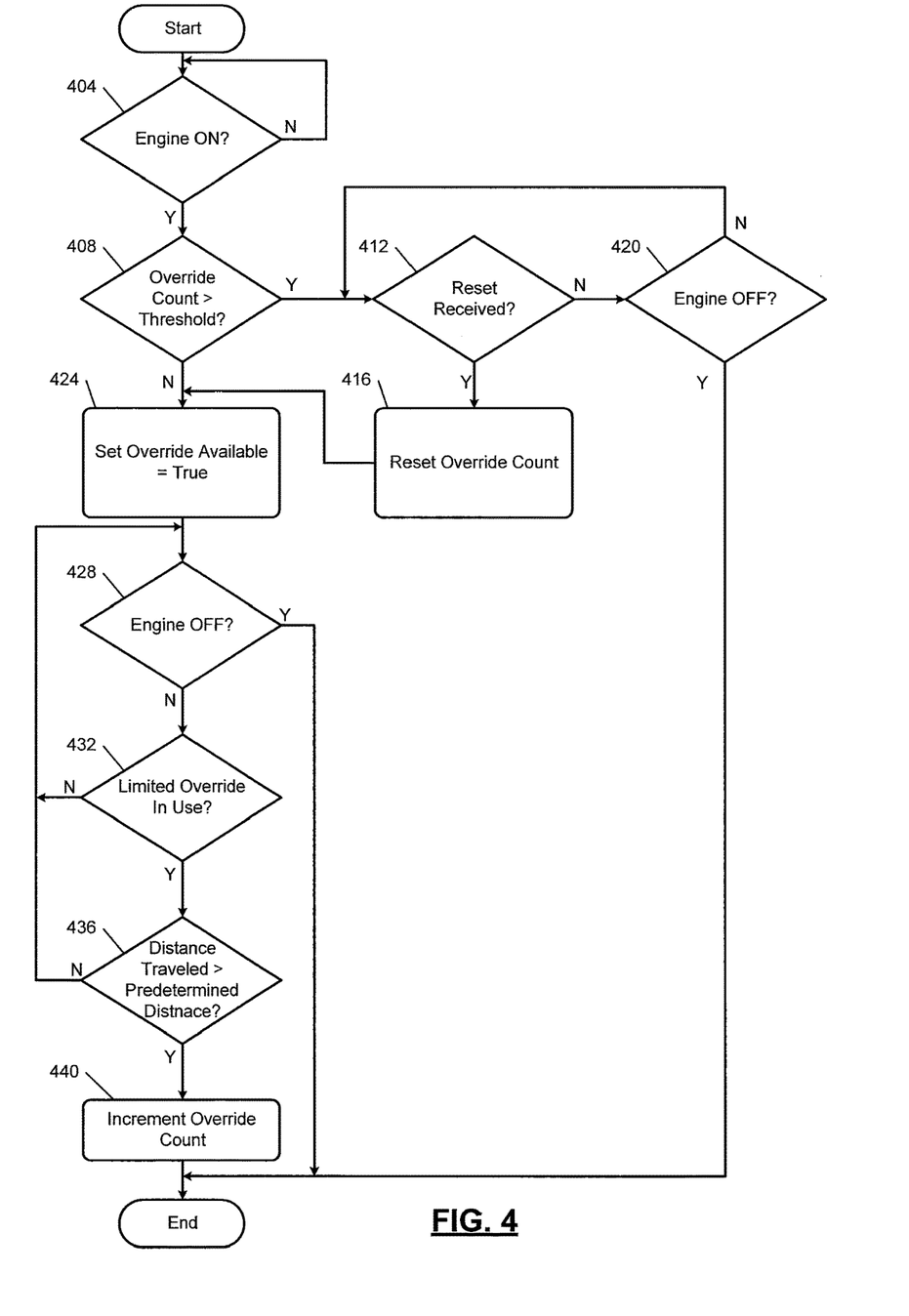
FIG. 4 includes a flowchart depicting an example method of resetting and counting a number of limited overrides of limitation of vehicle propulsion.

FIG. 4 is a flowchart depicting an example method of resetting and counting a number of limited overrides of impairment based limitation of operation of the engine 102 and/or the transmission 110. Control begins with 404 where the limited override module 212 determines whether the engine 102 has transitioned to on. For example, the limited override module 212 may determine whether the ignition state 178 has transitioned to accessory, crank, or run. If 404 is true, control may continue with 408. If 404 is false, control may remain at 404.

At 408, the override counter module 252 determines whether the counter value is greater than the predetermined value (e.g., 1). If 408 is false, control continues with 424, which is discussed further below. If 408 is true, control transfers to 412. At 412, the reset module 220 determines whether the reset request 260 has been received, such as via a service device that is external to the vehicle, from the remote assistant via the cellular transceiver 244, or via another type of resetting device. If 412 is true, the reset module 220 resets the counter value (e.g., to zero) at 416, and control transfers to 424. If 412 is false, control transfers to 420. At 420, the limited override module 212 determines whether the engine 102 has transitioned to off. For example, the limited override module 212 may determine whether the ignition state 178 has transitioned to off. If 420 is true, control may end. If 420 is false, control may return to 412.

At 424, based on the counter value being less than the predetermined value, the override counter module 252 sets the limited override signal to the first state, which allows a limited override to be used. At 428, the limited override module 212 determines whether the engine 102 has transitioned to off. For example, the limited override module 212 may determine whether the ignition state 178 has transitioned to off. If 428 is true, control may end. If 428 is false, control may continue with 432.

At 432, the limited override module 212 determines a limited override is presently in use. For example, the limited override module 212 may determine whether user input indicative of a confirmation to override the impairment based limitation on operation of the engine 102 and/or the transmission 110 has been received. If 432 is true, control continues with 436. If 432 is false, control may return to 428.

The override counter module 252 may determine whether the distance traveled 236 since the limited override began is greater than a third predetermined distance at 436. The third predetermined distance may be less than the first predetermined distance. For example only, the third predetermined distance may be 0.25 miles, 0.5 miles or another suitable distance. If 436 is true, the override counter module 252 increments the counter value (e.g., sets the counter value=counter value+1) at 440, and control may end. While control is shown as ending, control may return to 404 for a next engine startup. In various implementations, the example of FIG. 4 may be performed in parallel or concurrently with the example of FIGS. 3A and 3B.

While the example of prevent shifting of the transmission 110 out of park has been described, the present disclosure is more generally applicable to preventing movement of the vehicle. Vehicle movement can also be prevented in other ways, such as by applying mechanical brakes of the vehicle, preventing torque from being transferred to wheels of the vehicle, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An override system of a vehicle, comprising:
 a command module configured to:
  receive a concentration of a chemical in a driver's body measured using a chemical measurement device of the vehicle; and
  when the concentration of the chemical is greater than a predetermined concentration of the chemical, prevent movement of the vehicle; and
 an override module configured to, in response to receipt of user input indicative of an override request while the concentration of the chemical is greater than the predetermined concentration of the chemical, selectively generate a command to override the prevention of movement of the vehicle, wherein, the command module is further configured to, in response to the command, selectively allow movement of the vehicle.

2. The override system of claim 1 wherein the chemical is alcohol, wherein the command module prevents a transmission control module from shifting of a transmission of the vehicle out of park when the concentration of the chemical is greater than the predetermined concentration of the chemical, and in response to the command, the command module allows the transmission control module to shift the transmission out of park based on signals from a transmission range selector of the vehicle.

3. The override system of claim 2 wherein:
the override module is configured to:
generate the command to limit a vehicle speed to a predetermined maximum speed;
when a cellular transceiver of the vehicle is connected to a cellular network, set the predetermined maximum speed to a first predetermined maximum speed; and
when the cellular transceiver is not connected to the cellular network, set the predetermined maximum speed to a second predetermined maximum speed; and
the first predetermined maximum speed is less than the second predetermined maximum speed; and
the command module is further configured to, in response to the command, command an engine control module of the vehicle to limit a torque output of an engine based on limiting the vehicle speed to less than or equal to the predetermined maximum speed.

4. The override system of claim 3 wherein:
the override module is further configured to:
generate the command to limit a distance that the vehicle can travel pursuant to the override request to a predetermined distance;
when the cellular transceiver of the vehicle is connected to the cellular network, set the predetermined distance to a first predetermined maximum distance; and
when the cellular transceiver is not connected to the cellular network, set the predetermined distance to a second predetermined maximum distance; and
the first predetermined maximum distance is less than the second predetermined maximum distance.

5. The override system of claim 4 wherein the command module is further configured to, in response to the command, when the distance traveled by the vehicle after the override request is greater than the predetermined distance at least one of:
command the transmission control module to shift the transmission to neutral; and
command the engine control module to limit torque to limit a vehicle speed to zero.

6. The override system of claim 3 wherein:
the override module is further configured to:
when the cellular transceiver of the vehicle is connected to the cellular network, generate a second command to output sound from a horn of the vehicle based on a first predetermined duration;
when the cellular transceiver is not connected to the cellular network, generate the second command to output sound from the horn of the vehicle based on a second predetermined duration;
the second predetermined duration is less than the first predetermined duration; and
the override system further includes an output control module configured to apply power to the horn based on the second command.

7. The override system of claim 6 wherein:
the override module is further configured to:
when the cellular transceiver of the vehicle is connected to the cellular network, generate the second command to further turn an exterior light of the vehicle on and off at a first predetermined rate;
when the cellular transceiver of the vehicle is not connected to the cellular network, generate the second command to turn the exterior light of the vehicle on and off at a second predetermined rate;
the second predetermined rate is faster than the first predetermined rate; and
the output control module is further configured to turn the exterior light of the vehicle on and off based on the second command.

8. The override system of claim 1 wherein the override module is configured to, after generating the command, selectively deny future requests to override the prevention of the movement of the vehicle.

9. The override system of claim 1 wherein the override module is configured to:
in response to the receipt of user input indicative of the override request while the concentration of the chemical is greater than the predetermined concentration of the chemical, administer a behavioral test to a driver of the vehicle;
based on input received during the behavioral test, determine whether the driver passed the behavioral test; and
generate the command to override the prevention of the movement of the vehicle in response to a determination that the driver passed the behavioral test.

10. The override system of claim 9 wherein:
the override system further includes an output control module configured to, for the behavioral test, output at least one of audible and visual requests for performance of predetermined actions by the driver; and
the override module is further configured to determine whether the driver passed the behavioral test based on comparisons of the input received with expected inputs for the predetermined actions, respectively.

11. An override method for a vehicle, comprising:
receiving a concentration of a chemical in a driver's body measured using a chemical measurement device of the vehicle;
when the concentration of the chemical is greater than a predetermined concentration of the chemical, prevent movement of the vehicle;
in response to receipt of user input indicative of an override request while the concentration of the chemical is greater than the predetermined concentration of the chemical, selectively generating a command to override the prevention of movement of the vehicle; and
in response to the command, selectively allowing movement of the vehicle.

12. The override method of claim 11 wherein:
the chemical is alcohol;
the prevention of movement of the vehicle includes preventing shifting of a transmission of the vehicle out of park when the concentration of the chemical is greater than the predetermined concentration of the chemical; and the selectively allowing movement of the vehicle includes, in response to the command, allowing shifting the transmission out of park based on signals from a transmission range selector of the vehicle.

13. The override method of claim 12 further comprising:
generating a command to limit a vehicle speed to a predetermined maximum speed;
when a cellular transceiver of the vehicle is connected to a cellular network, setting the predetermined maximum speed to a first predetermined maximum speed;
when the cellular transceiver is not connected to the cellular network, setting the predetermined maximum speed to a second predetermined maximum speed,
wherein the first predetermined maximum speed is less than the second predetermined maximum speed; and
in response to the command, limiting a torque output of an engine based on limiting the vehicle speed to less than or equal to the predetermined maximum speed.

14. The override method of claim 13 further comprising:
generating the command to limit a distance that the vehicle can travel pursuant to the override request to a predetermined distance;
when the cellular transceiver of the vehicle is connected to the cellular network, setting the predetermined distance to a first predetermined maximum distance; and
when the cellular transceiver is not connected to the cellular network, setting the predetermined distance to a second predetermined maximum distance,
wherein the first predetermined maximum distance is less than the second predetermined maximum distance.

15. The override method of claim 14 further comprising, in response to the command, when the distance traveled by the vehicle after the override request is greater than the predetermined distance at least one of:
shifting the transmission to neutral; and
limiting a torque output based on limiting the vehicle speed to zero.

16. The override method of claim 13 further comprising:
when the cellular transceiver of the vehicle is connected to the cellular network, generating a second command to output sound from a horn of the vehicle based on a first predetermined duration;
when the cellular transceiver is not connected to the cellular network, generate the second command to output sound from the horn of the vehicle based on a second predetermined duration,
wherein the second predetermined duration is less than the first predetermined duration; and
applying power to the horn based on the second command.

17. The override method of claim 16 further comprising:
when the cellular transceiver of the vehicle is connected to the cellular network, generating the second command to further turn an exterior light of the vehicle on and off at a first predetermined rate;
when the cellular transceiver of the vehicle is not connected to the cellular network, generating the second command to turn the exterior light of the vehicle on and off at a second predetermined rate,
wherein the second predetermined rate is faster than the first predetermined rate; and turning the exterior light of the vehicle on and off based on the second command.

18. The override method of claim 11 further comprising, after generating the command, selectively denying future requests to override the prevention of movement of the vehicle.

19. The override method of claim 11 further comprising:
in response to the receipt of user input indicative of the override request while the concentration of the chemical is greater than the predetermined concentration of the chemical, by an override control module, administering a behavioral test to a driver of the vehicle;
based on input received during the behavioral test, by the override control module, determining whether the driver passed the behavioral test; and
generating the command to override the prevention of the movement of the vehicle in response to a determination that the driver passed the behavioral test.

20. The override method of claim 19 further comprising:
for the behavioral test, by an output control module, outputting at least one of audible and visual requests for performance of predetermined actions by the driver; and
determining, by the override control module, whether the driver passed the behavioral test based on comparisons of the input received with expected inputs for the predetermined actions, respectively.

21. An override system of a vehicle, comprising:
a command module configured to:
receive a concentration of a chemical in a driver's body measured using a chemical measurement device of the vehicle; and
when the concentration of the chemical is greater than a predetermined concentration of the chemical, prevent movement of the vehicle; and
an override module configured to, in response to receipt of user input indicative of an override request while the concentration of the chemical is greater than the predetermined concentration of the chemical, selectively generate a command to override the prevention of movement of the vehicle,
wherein, the command module is further configured to, in response to the command, selectively allow movement of the vehicle,
wherein the override module is further configured to:
generate the command to limit a vehicle speed to a predetermined maximum speed;
when a cellular transceiver of the vehicle is connected to a cellular network, set the predetermined maximum speed to a first predetermined maximum speed; and
when the cellular transceiver is not connected to the cellular network, set the predetermined maximum speed to a second predetermined maximum speed,
wherein the first predetermined maximum speed is less than the second predetermined maximum speed; and
wherein the command module is further configured to, in response to the command, command an engine control module of the vehicle to limit a torque output of an engine based on limiting the vehicle speed to less than or equal to the predetermined maximum speed.

\* \* \* \* \*